United States Patent
Oertli et al.

(10) Patent No.: US 8,399,102 B2
(45) Date of Patent: Mar. 19, 2013

(54) MOISTURE-HARDENING COMPOSITIONS CONTAINING SILANE-FUNCTIONAL POLYMERS AND AMINOSILANE ADDUCTS

(75) Inventors: Marcel Oertli, Zurich (CH); Barbara Jucker, Zurich (CH); Ueli Pfenninger, Au (CH); Pierre-André Bütikofer, Wallisellen (CH)

(73) Assignee: Sika Technology AG, Baar (CH)

( * ) Notice: Subject to any disclaimer, the term of this patent is extended or adjusted under 35 U.S.C. 154(b) by 817 days.

(21) Appl. No.: 12/087,730

(22) PCT Filed: Apr. 26, 2007

(86) PCT No.: PCT/EP2007/054085
§ 371 (c)(1),
(2), (4) Date: Aug. 19, 2008

(87) PCT Pub. No.: WO2007/122261
PCT Pub. Date: Nov. 1, 2007

(65) Prior Publication Data
US 2010/0159254 A1    Jun. 24, 2010

(30) Foreign Application Priority Data

Apr. 26, 2006 (EP) .................................. 06113150

(51) Int. Cl.
*C09J 7/02* (2006.01)
*C07F 7/18* (2006.01)
*C08G 18/83* (2006.01)

(52) U.S. Cl. ........ 428/447; 525/453; 525/454; 525/342; 525/374; 525/379; 156/60; 156/327; 156/329; 156/330.9; 427/387; 524/188

(58) Field of Classification Search .................. 525/453, 525/454, 342, 374, 379; 156/60, 327, 329, 156/330.9; 428/447; 427/387; 524/188
See application file for complete search history.

(56) References Cited

U.S. PATENT DOCUMENTS

| | | | |
|---|---|---|---|
| 3,971,751 A | 7/1976 | Isayama et al. | |
| 3,979,344 A | 9/1976 | Bryant et al. | |
| 4,067,844 A | 1/1978 | Barron et al. | |
| 5,147,927 A | 9/1992 | Baghdachi et al. | |
| 6,001,946 A | 12/1999 | Waldman et al. | |
| 6,207,766 B1 | 3/2001 | Doi et al. | |
| 6,599,354 B1 | 7/2003 | Schmalstieg et al. | |
| 6,703,453 B1 | 3/2004 | Schmalstieg et al. | |
| 2004/0132864 A1 | 7/2004 | Shibahara et al. | |
| 2006/0189736 A1 * | 8/2006 | Mori et al. | 524/404 |

FOREIGN PATENT DOCUMENTS

| | | |
|---|---|---|
| EP | 0 819 749 A2 | 1/1998 |
| EP | 0 831 108 B1 | 4/2004 |
| EP | 1 431 366 A1 | 6/2004 |
| WO | WO 2005007751 A1 * | 1/2005 |

\* cited by examiner

*Primary Examiner* — Robert C Boyle
(74) *Attorney, Agent, or Firm* — Oliff & Berridge, PLC

(57) ABSTRACT

The current invention relates to a moisture-hardening composition that contains, in addition to a silane-functional polymer with end groups of formula (I), a reaction product that can be manufactured from an amino silane with primary amino groups and an alkene that is free of silane groups. The compositions are characterized by improved expandability with concurrent high reactivity, good adhesion characteristics, and high tear strength and are suited especially for use as elastic bonding substance or sealant.

14 Claims, No Drawings

MOISTURE-HARDENING COMPOSITIONS CONTAINING SILANE-FUNCTIONAL POLYMERS AND AMINOSILANE ADDUCTS

TECHNICAL FIELD

The invention relates to moisture-curing compositions comprising silane-functional polymers.

BACKGROUND ART

Moisture-curing compositions based on silane-functional polymers are known and are used among other things as elastic adhesives, sealants, and coatings. They are free from isocyanate groups and therefore constitute an alternative, one preferred from a toxicological standpoint, to the isocyanate-containing polyurethane systems.

For the majority of these applications, as a sealant or as an assembly adhesive, for example, it is critical that the compositions cure rapidly and in the cured state possess good mechanical properties and good adhesion properties. Particularly important is a combination of extensibility and high tensile strength. However, such compositions often fail to satisfy these requirements.

The use of organoalkoxysilanes as additives in moisture-curing compositions based on silane-functional polymers is known. They are typically used in order to tweak properties such as adhesion, storage stability, and reactivity, as is described, for example, in U.S. Pat. Nos. 3,979,344, 5,147,927, and EP 0 819 749 A1.

U.S. Pat. No. 6,703,453 discloses moisture-curing compositions based on silane-functional polymers which include, among other constituents, an adduct of an aminosilane and maleic or fumaric esters. The compositions are said to exhibit improved mechanical properties and an improved storage stability.

DISCLOSURE OF THE INVENTION

It is an object of the present invention to provide moisture-curing compositions based on silane-functional polymers, with end groups of the formula (I) shown below, which exhibit enhanced extensibility in tandem with high reactivity, good adhesion properties, and high tensile strength, and which are therefore suitable more particularly for application as sealants, adhesives or coatings, more particularly as elastic adhesives or sealants.

Surprisingly, it has been found that moisture-curing compositions according to embodiments of the invention achieve these objects. These compositions, in relation to the prior art, more particularly possess an enhanced extensibility, without exhibiting substantial falls in terms of curing rate and adhesion properties One aspect of the invention relates to the use of a reaction product which represents a constituent of the composition as an adhesion promoter for moisture-curing compositions which comprise silane-functional polymers having the end groups of the formula (I).

Additionally, embodiments of the invention are directed to methods of adhesive bonding and of sealing as well as to adhesively bonded or sealed articles.

Further embodiments are subject matter of the dependent claims.

EMBODIMENTS OF THE INVENTION

The invention provides moisture-curing compositions comprising
a) at least one silane-functional polymer P having end groups of the formula (I)

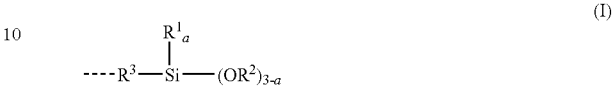

where
$R^1$ is an alkyl group having 1 to 8 C atoms, more particularly a methyl or an ethyl group;
$R^2$ is an acyl group or alkyl group having 1 to 5 C atoms, more particularly a methyl group or an ethyl group or an isopropyl group;
a is 0, 1 or 2, preferably 0 or 1; and
$R^3$ is a linear or branched, optionally cyclic, alkylene group having 2 to 12 C atoms, optionally with aromatic fractions, and optionally with one or more heteroatoms, more particularly nitrogen atoms; and
b) at least one reaction product R, prepared from at least one aminosilane A1 having at least one primary amino group and at least one silane-group-free alkene M of the formula (II) or (III) or (IV)

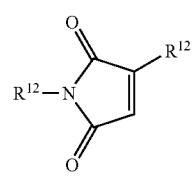

where
$R^9$ is $R^{12}$ or —CN, and
$R^{10}$ is a substituent which is selected from the group consisting of —COOR$^{12}$, —CONHR$^{12}$, —CON(R$^{12}$)$_2$, —CN, —NO$_2$, —PO(OR$^{12}$)$_2$, —SO$_2$R$^{12}$, and —SO$_2$OR$^{12}$, and
$R^{11}$ is a substituent which is selected from the group consisting of —R$^{12}$, —COOR$^{12}$, —CH$_2$—COOR$^{12}$, and —CN,
$R^{12}$ is a hydrogen atom or a monovalent, optionally heteroatom-containing, hydrocarbon radical having 1 to 20 C atoms.

Dashed lines in formulae in the present document represent in each case the connections to the respective substituent.

The term "polymer" embraces in the present document, on the one hand, a collective of chemically uniform macromolecules which nevertheless differ in respect of degree of polymerization, molar mass, and chain length and which have been prepared by a polyreaction (polymerization, polyaddition, polycondensation). On the other hand the term also embraces derivatives of such a collective of macromolecules from polymerization reactions, in other words compounds which have been obtained by reactions, such as addition reactions or substitution reactions, for example, of functional groups on existing macromolecules and which may be chemically uniform or chemically nonuniform. The term further embraces what are known as prepolymers—that is, reactive oligomeric preadducts whose functional groups are involved in the construction of macromolecules.

The term "polyurethane polymer" encompasses all polymers which are prepared by the process known as the diisocyanate polyaddition process. This also includes those polymers which are virtually or entirely free of urethane groups. Examples of polyurethane polymers are polyether-polyurethanes, polyester-polyurethanes, polyether-polyureas, polyureas, polyester-polyureas, polyisocyanurates, and polycarbodiimides.

The term "silane" is used in the present document to refer to organoalkoxysilanes, in other words compounds in which there is at least one, typically two or three, alkoxy group(s) attached directly to the silicon atom (via an Si—O bond) and which, on the other hand, have at least one organic radical attached directly to the silicon atom (via an Si—C bond). Correspondingly, the term "silane group" refers to the silicon-containing group attached to the organic radical of an organoalkoxysilane. The silanes, or their silane groups, have the property of hydrolyzing on contact with moisture. This hydrolysis is accompanied by the formation of organosilanols, in other words organosilicon compounds containing one or more silanol groups (Si—OH groups) and, through subsequent condensation reactions, organosiloxanes, in other words organosilicon compounds containing one or more siloxane groups (Si—O—Si groups). The term "silane-functional" refers to compounds, more particularly polymers, which contain silane groups.

The term "aminosilane" refers to silanes which carry an amino group as a substituent on the organic radical.

The term "isocyanatosilane" refers to silanes which carry an isocyanate group as a substituent on the organic radical.

The moisture-curing composition comprises at least one silane-functional polymer P having end groups of the aforementioned formula (I). The silane-functional polymer P may represent the following polymers:

(i) a silane-functional polyurethane polymer P1 obtainable by the reaction of an aminosilane A2 with a polyurethane polymer containing terminal isocyanate groups; or (ii) a silane-functional polyurethane polymer P2 obtainable by the reaction of an isocyanatosilane IS with a polymer containing terminal hydroxyl groups; or (iii) a silane-functional polymer P3 obtainable by the hydrosilylation of a polymer having terminal double bonds.

In one first embodiment the silane-functional polymer P is a silane-functional polyurethane polymer P1 which is obtainable by the reaction of an aminosilane A2 with a polyurethane polymer containing terminal isocyanate groups. This reaction is carried out preferably in a stoichiometric ratio between amino groups and isocyanate groups or with a slight excess of amino groups, with the result that the silane-functional polyurethane polymer P1 obtained is entirely free of isocyanate groups.

The aminosilane A2 has the formula (V)

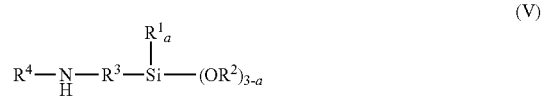

where $R^1$, $R^2$, $R^3$, and a have the same definition as in formula (I), and $R^4$ is a hydrogen atom or is a linear or branched hydrocarbon radical having 1 to 20 C atoms, which optionally contains cyclic fractions, or is a radical of the formula (VI)

where $R^5$ and $R^6$, independently of one another, are each a hydrogen atom or a radical from the group encompassing $R^8$, —COOR$^8$, and —CN, and $R^7$ is a hydrogen atom or is a radical from the group encompassing —CH$_2$—COOR$^8$, —COOR$^8$, —CONHR$^8$, —CON(R$^8$)$_2$, —CN, —NO$_2$, —PO(O)$_2$, —SO$_2$R$^8$, and —SO$_2$OR$^8$, where $R^8$ is a hydrocarbon radical having 1 to 20 C atoms and optionally containing at least one heteroatom.

Examples of suitable aminosilanes A2 are primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyltrimethoxysilane; the products of the Michael-like addition of primary aminosilanes such as 3-aminopropyltrimethoxysilane or 3-aminopropyldimethoxymethylsilane with Michael acceptors such as acrylonitrile, acrylic and methacrylic esters, acrylamides or methacrylamides, maleic and fumaric diesters, citraconic diesters, and itaconic diesters, examples being dimethyl and diethyl N-(3-trimethoxysilylpropyl)aminosuccinate; and also analogues of said aminosilanes with ethoxy or isopropoxy groups instead of the methoxy groups on the silicon. Particularly suitable aminosilanes A2 are secondary aminosilanes, i.e., aminosilanes A2 in which $R^4$ in formula (V) is other than H. Preference is given to the Michael-like adducts, more particularly diethyl N-(3-trimethoxysilylpropyl)aminosuccinate.

The term "Michael acceptor" in the present document identifies compounds which on the basis of the double bonds they contain that are activated by electron acceptor radicals are capable of entering with primary amino groups (NH$_2$ groups) into nucleophilic addition reactions in a manner analogous to the Michael addition (hetero-Michael addition).

Examples of polyurethane polymer containing terminal isocyanate groups suitable for preparing a silane-functional polyurethane polymer P1 are polymers which are obtainable by the reaction of at least one polyol with at least one polyisocyanate, more particularly a diisocyanate. This reaction may take place by the polyol and the polyisocyanate being reacted by typical methods, at temperatures from 50° C. to 100° C., for example, where appropriate with the accompanying use of suitable catalysts, the polyisocyanate being metered in such a way that its isocyanate groups are in a stoichiometric excess in relation to the hydroxyl groups of the polyol.

The excess of polyisocyanate is selected more particularly such that the resultant polyurethane polymer, following the reaction of all of the hydroxyl groups of the polyol, is left with a free isocyanate content of 0.1%-5%, preferably 0.25%-2.5%, more preferably 0.3%-1%, by weight, based on the overall polymer.

Where appropriate the polyurethane polymer can be prepared with the accompanying use of plasticizers, the plasticizers used containing no isocyanate-reactive groups.

Preference is given to polyurethane polymers having the stated free isocyanate content and obtained from the reaction of diisocyanates with high molecular weight diols in an NCO/OH ratio of 1.5/1 to 2/1.

Polyols which can be used for preparing a polyurethane polymer containing, terminally, isocyanate groups include, for example, the following commercially commonplace polyols, or any desired mixtures of them:

polyoxyalkylene polyols, also called polyether polyols or oligoetherols, which are polymerization products of ethylene oxide, 1,2-propylene oxide, 1,2- or 2,3-butylene oxide, tetrahydrofuran or mixtures of them, optionally polymerized by means of a starter molecule having two or more active hydrogen atoms, such as, for example, water, ammonia or compounds having two or more OH or NH groups, such as, for example, 1,2-ethanediol, 1,2- and 1,3-propanediol, neopentyl glycol, diethylene glycol, triethylene glycol and polyethylene glycols, the isomeric dipropylene glycols, tripropylene glycols, and polypropylene glycols, the isomeric butanediols, pentanediols, hexanediols and heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made not only of polyoxyalkylene polyols which have a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts), but also of polyoxyalkylene polyols having a higher degree of unsaturation, prepared, for example, with the aid of anionic catalysts such as NaOH, KOH, CsOH or alkali metal alkoxides. Particular suitability is possessed by polyoxyalkylene diols or polyoxyalkylene triols, more particularly polyoxypropylene diols or polyoxypropylene triols.

Especially suitable are polyoxyalkylene diols or polyoxyalkylene triols having a degree of unsaturation of less than 0.02 meq/g and having a molecular weight in the range of 1000-30 000 g/mol, and also polyoxypropylene diols and triols having a molecular weight of 400-8000 g/mol. The term "molecular weight" in the present document refers to the molecular weight average $M_n$.

Likewise particularly suitable are what are called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, after the end of the polypropoxylation reaction, to continued alkoxylation with ethylene oxide, and which as a result contain primary hydroxyl groups.

Styrene-acrylonitrile- or acrylonitrile-methyl methacrylate-grafted polyether polyols.

Polyester polyols, also called oligoesterols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols formed from lactones such as ε-caprolactone, for example.

Polycarbonate polyols, of the kind obtainable by reaction, for example, of the above-mentioned alcohols—those used to synthesize the polyester polyols—with dialkyl carbonates, diaryl carbonates or phosgene.

Polyacrylate and polymethacrylate polyols.

Polyhydrocarbon polyols, also called oligohydrocarbonols, such as, for example, polyhydroxy-functional ethylene-propylene, ethylene-butylene or ethylene-propylene-diene copolymers, of the kind manufactured, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional polybutadiene polyols, of the kind, for example, prepared by copolymerizing 1,3-butadiene and allyl alcohol.

Polyhydroxy-functional acrylonitrile/polybutadiene copolymers, of the kind, for example, preparable from epoxides or amino alcohols and carboxyl-terminated acrylonitrile/polybutadiene copolymers (available commercially under the name Hycar® CTBN from Noveon).

These stated polyols have an average molecular weight of 250-30 000 g/mol, more particularly of 1000-30 000 g/mol, and an average OH functionality in the range from 1.6 to 3.

Preferred polyols are polyoxyalkylene polyols. Additionally preferred as polyols are diols. Particular preference is given to polyoxyalkylene diols, more particularly those having a degree of unsaturation of less than 0.02 meq/g and a molecular weight in the range of 4000-30 000 g/mol, more particularly 8000-30 000 g/mol.

In addition to these stated polyols it is possible alongside them to use small amounts of low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other polyfunctional alcohols, low molecular weight alkoxylation products of the aforementioned dihydric and polyhydric alcohols, and also mixtures of the aforementioned alcohols, when preparing the polyurethane polymer containing terminal isocyanate groups.

As polyisocyanates for preparing a polyurethane polymer containing, terminally, isocyanate groups it is possible for example to use the following commercially commonplace polyisocyanates:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis (isocyanatomethyl)cyclohexane, m- and p-xylylene diisocyanate (m- and p-XDI), m- and p-tetramethyl-1,3- and -1,4-xylylene diisocyanate (m- and p-TMCDI), bis(1-isocyanato-1-methylethyl (naphthalene), 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforementioned isocyanates, and also any desired mixtures of the aforementioned isocyanates. Preference is given to MDI, TDI, HDI, and IPDI.

In a second embodiment the silane-functional polymer P is a silane-functional polyurethane polymer P2 obtainable by the reaction of an isocyanatosilane IS with a polymer containing terminal hydroxyl groups. This reaction takes place in a stoichiometric ratio between the isocyanate groups and the hydroxyl groups, at, for example, temperatures of 20° C. to 100° C., where appropriate with the accompanying use of catalysts.

Compounds with suitability as isocyanatosilane IS are compounds of the formula (VII)

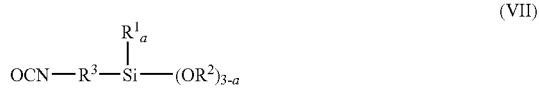

(VII)

where $R^1$, $R^2$, $R^3$, and a have the same definition as in formula (I).

Examples of suitable isocyanatosilanes IS of the formula (VII) are 3-isocyanatopropyltrimethoxysilane, 3-isocyanatopropyldimethoxymethylsilane, and their analogues with ethoxy or isopropoxy groups instead of the methoxy groups on the silicon.

Polymers containing terminal hydroxyl groups suitably include, on the one hand, abovementioned high molecular weight polyoxyalkylene polyols, preferably polyoxy-propylene diols having a degree of unsaturation of less than 0.02 meq/g and having a molecular weight in the range from 4000 to 30 000 g/mol, more particularly those having a molecular weight in the range from 8000 to 30 000 g/mol.

Suitability is also possessed, on the other hand, by polyurethane polymers containing terminal hydroxyl groups for the reaction with isocyanatosilanes IS of the formula (VII). Polyurethane polymers of this kind are obtainable by the reaction of at least one polyisocyanate with at least one polyol. This reaction may take place by reacting the polyol and the polyisocyanate by typical methods, at temperatures from 50° C. to 100° C., for example, where appropriate with accompanying use of suitable catalysts, the polyol being metered such that its hydroxyl groups are in stoichiometric excess in relation to the isocyanate groups of the polyisocyanate. Preference is given to a ratio of hydroxyl groups to isocyanate groups of 1.3/1 to 4/1, more particularly of 1.8/1 to 2.1/1. Where appropriate the polyurethane polymer can be prepared with accompanying use of plasticizers, the plasticizers used containing no isocyanate-reactive groups. Suitability for this reaction is possessed for the same polyols and polyisocyanates already mentioned above as being suitable for preparing a polyurethane polymer, containing terminal isocyanate groups, which is used for the preparation of a silane-functional polyurethane polymer P1.

Examples of commercially available silane-functional polymers P2 are the products with the trade names SPUR+® 1010LM, 1015LM, and 1050MM (all from GE); and also Geniosil® STP-E15 and Geniosil® STP-E35 (both from Wacker Chemie AG).

In a third embodiment the silane-functional polymer P is a silane-functional polymer P3 which is obtainable by a hydrosilylation reaction of polymers having terminal double bonds, examples being poly(meth)acrylate polymers or polyether polymers, more particularly of allyl-terminated polyoxyalkylene polymers, described, for example, in U.S. Pat. No. 3,971,751 and U.S. Pat. No. 6,207,766.

Examples of commercially available silane-functional polymers P3 are the products having the trade names MS-Polymer® S203(H), S303(H), S227, S810, MA903 and S943, Silyl® SAX220, SAX350, SAX400 and SAX725, Silyl® SAT350 and SAT400, and also XMAP® SA100S and SA310S (all from Kaneka); Polymer ST50 (from Hanse-Chemie); and also Excestar® S2410, S2420, S3430, S3630, W2450 and MSX931 (all from Asahi Glass).

Typically the silane-functional polymer P is present in an amount of 10%-80% by weight, preferably in an amount of 15%-50% by weight, based on the moisture-curing composition.

The moisture-curing composition comprises further to the silane-functional polymer P at least one reaction product R prepared from at least one aminosilane A1 having at least one primary amino group, and from at least one silane-group-free alkene M of the aforementioned formulae (II) or (III) or (IV). The reaction product R is also referred to as "adducted aminosilane".

Aminosilanes A1 suitable for preparing a reaction product R and having at least one primary amino group are compounds of the formula (VIII)

(VIII)

where $R^{13}$ is an alkyl group having 1 to 8 C atoms, preferably a methyl group or an ethyl group, more particularly a methyl group, $R^{14}$ is an acyl group or an alkyl group having 1 to 5 C atoms, preferably a methyl group or an ethyl group or an isopropyl group, more particularly a methyl group or an ethyl group, $R^{15}$ is a linear or branched, optionally cyclic, alkylene group having 1 to 20 C atoms, optionally with aromatic fractions, and optionally with heteroatoms, more particularly ether oxygen or secondary amine nitrogen, and b is 0, 1 or 2, preferably 0 or 1.

Particularly suitable aminosilanes A1 are the following commercially commonplace aminosilanes:

3-aminopropyltrimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, and also their analogues with ethoxy or isopropoxy groups instead of the methoxy groups on the silicon.

Particularly suitable aminosilanes A1 are also those known as diaminosilanes, in other words aminosilanes which as well as a primary amino group carry a secondary amino group (NH group), which more particularly is positioned γ to the silicon atom. Examples of diaminosilanes of this kind are N-(2-aminoethyl)-3-aminopropylsilanes such as N-(2-aminoethyl)-3-aminopropyltrimethoxysilane, N-(2-aminoethyl)-3-aminoproplmethyldimethoxysilane, N-(2-aminoethyl)-3-aminopropyltriethoxysilane and N-(2-aminoethyl)-3-aminopropyltriisopropoxysilane.

Particularly suitable aminosilanes A1 are additionally those known as triaminosilanes, which in addition to a primary amino group carry two secondary amino groups (NH groups), such as, for example, N-(2-aminoethyl)-N'-[3-(trimethoxysilyl)propyl]ethylenediamine.

Preference as aminosilane A1 is given to aminosilanes of the formula (IX)

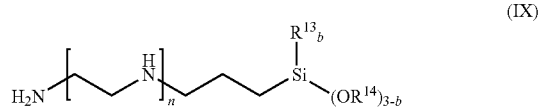

(IX)

with n=0, 1 or 2 and b=0 or 1, $R^{13}$=methyl and $R^{14}$=methyl or ethyl or isopropyl.

With particular preference the aminosilane A1 is selected from the group consisting of 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, and N-(2-aminoethyl)-N'[3-(trimethoxysilyl)propyl]ethylenediamine, N-(2-aminoethyl)-N'-[3-methyldimethoxysilyl)propyl]ethylenediamine, and N-(2-aminoethyl)-N'-[3-(triethoxysilyl)propyl]ethylenediamine.

Especially preferred are aminosilanes A1 having more than one amino group per molecule, more particularly aminosilanes A1 of the formula (IX) with n=1 or 2. These aminosilanes lead to reaction products R which contain more than one amino group per molecule. Since the amino groups have the effect more particularly of catalyzing the hydrolysis of the silane groups, a higher level of amino groups in the reaction product R produces accelerated curing of the composition, which for many applications is an advantage.

Especially preferred more particularly are the diaminosilanes N-(2-aminoethyl)-3-aminopropyltrimethoxysilane, N-(2-aminoethyl)-3-aminopropylmethyldimethoxysilane, and N-(2-aminoethyl)-3-aminopropyltriethoxysilane and also the triaminosilanes N-(2-aminoethyl)-N'-[3-(trimethoxysilyl)propyl]ethylenediamine, N-(2-aminoethyl)-N'-[3-(methyldimethoxysilyl)propyl]-ethylenediamine, and N-(2-aminoethyl)-N'-[3-(triethoxysilyl)propyl]ethylenediamine.

Silane-group-free alkenes M suitable for the preparation of a reaction product R are compounds of the formulae (II) or (III) or (IV)

(II)

(III)

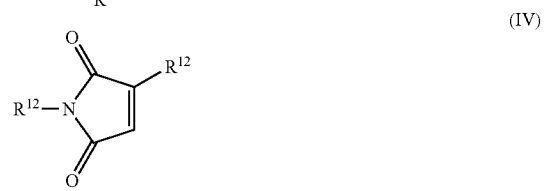

(IV)

where
$R^9$ is $R^{12}$ or —CN, and
$R^{10}$ is a substituent which is selected from the group consisting of —COOR$^{12}$, —CONHR$^{12}$, —CON(R$^{12}$)$_2$, —CN, —NO$_2$, —PO(OR$^{12}$)$_2$, —SO$_2$R$^{12}$, and —SO$_2$OR$^{12}$, and
$R^{11}$ is a substituent which is selected from the group consisting of —R$^{12}$, —COOR$^{12}$, —CH$_2$—COOR$^{12}$, and —CN,
$R^{12}$ is a hydrogen atom or a monovalent, optionally heteroatom-containing, hydrocarbon radical having 1 to 20 C atoms.

Examples of suitable alkenes M of the formula (II) or (III) are acrylic or methacrylic esters such as methyl (meth)acrylate, ethyl (meth)acrylate, butyl (meth)acrylate, isodecyl (meth)acrylate, lauryl (meth)acrylate, stearyl (meth)acrylate, tetrahydrofurfuryl (meth)acrylate, isobornyl (meth)acrylate, ethylene glycol dicyclopentenyl ether (meth)acrylate, 2-hydroxyethyl (meth)acrylate, 3-hydroxypropyl (meth)acrylate; acrylamides or methacrylamides such as (meth)acrylamide, methyl(meth)acrylamide, butyl(meth)-acrylamide, dimethyl (meth)acrylamide, dibutyl(meth)-acrylamide; itaconic diesters such as dimethyl itaconate; cinnamic esters such as methyl cinnamate; vinylphosphonic diesters such as dimethyl vinylphosphonate; vinylsulfonic esters, more particularly aryl vinylsulfonates; vinyl sulfones; vinyl nitriles such as acrylonitrile, crotonitrile, 2-pentenenitrile or fumaronitrile; 1-nitroethylenes such as β-nitrostyrene; and Knoevenagel condensation products, such as those, for example, of malonic diesters of malonitrile and aldehydes such as acetaldehyde, propionaldehyde or benzaldehyde.

Preferably the alkene M of the formula (II) or (III) is selected from the group consisting of tetrahydrofurfuryl, isobornyl, isodecyl, hexyl, lauryl, stearyl, ethylene glycol dicyclopentenyl ether, 2-hydroxyethyl, and 3-hydroxypropyl (meth)acrylate, (meth)acrylamide, N-methyl(meth)acrylamide, N,N-dimethyl(meth)acrylamide, dimethyl, diethyl, and dibutyl phosphonate, acrylonitrile, 2-pentenenitrile, fumaronitrile, and β-nitrostyrene, and also mixtures of these compounds.

Examples of suitable alkenes M of the formula (IV) are maleimides, and also N-alkylmaleimides such as, for example, N-methyl-, N-ethyl-, and N-propylmaleimide, and also N-alkylmaleimides derived from fatty amines, such as, for example, N-decyl-, N-lauryl- or N-stearyl-maleimide, and also technical mixtures of such maleimides derived from fatty amines.

Through the reaction of at least one aminosilane A1 having at least one primary amino group and at least one alkene M of the formulae (II), (III) or (IV) the reaction product R is obtained.

The alkenes M are Michael acceptors which are able to enter with the primary amino group of the aminosilane A1 into a nucleophilic addition reaction analogous to the Michael addition. It is a key attribute of the alkenes M that they contain per molecule only one double bond which is capable of entering, as a Michael acceptor, into a nucleophilic addition with the primary amino group of the aminosilane A1. The result, therefore, is reaction products R which contain only one silane group per molecule.

The reaction may take place more quickly or more slowly according to the type and structure of the aminosilane A1 and more particularly of the alkene M. It may also proceed incompletely, with the consequence that the reaction product R may include fractions of unreacted aminosilane A1 and/or alkene M.

The reaction product R contains aminosilane adducts of the formulae (X) or (XI)

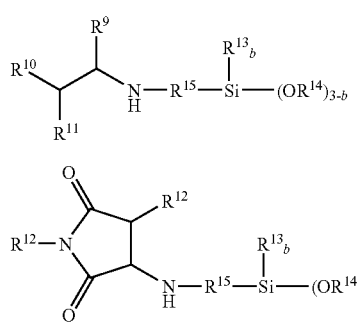

where $R^9$, $R^{10}$, $R^{11}$, $R^{12}$, $R^{13}$, $R^{14}$, $R^{15}$, and b have the definitions already stated.

It is preferred to react the aminosilane A1 and the alkene M with one another to give the reaction product R and then to mix said product with the silane-functional polymer P. An alternative option is to carry out the reaction directly in the silane-functional polymer P, by mixing the aminosilane A1 and the alkene M separately from one another with the silane-functional polymer P.

The moisture-curing composition typically has a reaction product R content in the range of 0.1%-10% by weight, preferably 0.3%-5% by weight.

The presence of the reaction product R instead of an unadducted aminosilane A1 in the moisture-curing composition has the advantage that the catalyzing properties and the adhesion-promoting properties of the aminosilane A1 are substantially retained, while the embrittling effect of the unadducted aminosilane A1, namely a distinct decrease in the breaking elongation of the cured composition, does not occur. A moisture-curing composition of the invention comprising a reaction product R therefore has substantially the same rapid cure rate and the same good adhesion properties as a composition which comprises the corresponding aminosilane A1 in unadducted form, while the breaking elongation is considerably higher.

The moisture-curing composition of the invention may comprise further components in addition to at least one silane-functional polymer P and at least one reaction product R. Additional components that may be present include the following auxiliaries and additives:

plasticizers, examples being esters of organic carboxylic acids or their anhydrides, such as phthalates, examples being dioctyl phthalate, diisononyl phthalate or diisodecyl phthalate, adipates, dioctyl adipate for example, azelates and sebacates, polyols, examples being polyoxyalkylene polyols or polyester polyols, organic phosphoric and sulfonic esters or polybutenes;

solvents;

inorganic and organic fillers, examples being ground or precipitated calcium carbonates, optionally coated with stearates, more particularly finely divided coated calcium carbonate, carbon blacks, especially industrially manufactured carbon blacks (identified below as "carbon black"), kaolins, aluminum oxides, silicas, more particularly highly disperse silicas from pyrolysis operations, PVC powders or hollow beads.

Preferred fillers are carbon black, calcium carbonates, more particularly finely divided coated calcium carbonates, highly disperse silicas from pyrolysis operations, and combinations of these fillers.

fibers, of polyethylene for example;

pigments, titanium dioxide, for example;

catalysts, examples being metal catalysts in the form of organotin compounds such as dibutyltin dilaurate and dibutyltin diacetylacetonate, organobismuth compounds or bismuth complexes; amino-containing compounds, examples being 1,4-diazabicyclo[2.2.2]octane and 2,2'-dimorpholino-diethyl ether, and also aminosilanes, more particularly the aforementioned aminosilanes A1 or A2.

Preferred catalysts are on the one hand amino-containing catalysts in the form of aminosilanes, more particularly aminosilanes A1, and also metal catalysts, more particularly organotin compounds such as dibutyltin dilaurate and dibutyltin diacetylacetonate, organobismuth compounds or bismuth complexes, and titanium catalysts, and combinations of different metal catalysts, and also combinations of aminosilanes and metal catalysts.

rheology modifiers, such as, for example, thickeners, examples being urea compounds, polyamide waxes, bentonites or fumed silicas;

other adhesion promoters, examples being epoxysilanes, (meth)acrylosilanes, anhydridosilanes or adducts of the aforementioned silanes with primary aminosilanes, and also urea silanes;

crosslinkers, examples being silane-functional oligomers and polymers;

drying agents, such as vinyltrimethoxysilane, α-functional silanes such as N-(silylmethyl)-O-methylcarbamates, more particularly N-(methyldimethoxysilylmethyl)-O-methylcarbamate, (methacryloxymethyl)silanes, methoxymethylsilanes, N-phenyl-, N-cyclohexyl-, and N-alkylsilanes, orthoformic esters, calcium oxide or molecular sieves;

stabilizers against heat, light radiation, and UV radiation;

flame retardants;

surface-active substances, such as wetting agents, flow control agents, devolatilizing agents or defoamers, for example;

biocides, such as algicides, fungicides or fungal growth inhibitor substances, for example;

and also other substances typically used in moisture-curing compositions.

It is advantageous to ensure that not only the reaction product R but also any further components do not adversely affect the storage stability of the composition, i.e., to ensure that, during storage, they are unable to any significant extent to initiate the reaction of the silane groups present in the composition that leads to crosslinking. More particularly this means that such further components contain preferably no water or, at most, traces of water. It can be sensible to dry certain components chemically or physically before mixing them into the composition.

The moisture-curing composition preferably comprises plasticizers, fillers, and catalysts.

The moisture-curing composition described is kept under moisture-free conditions. It is storage stable—that is, under moisture-free conditions, it can be kept in a suitable pack or facility, such as a drum, a pouch or a cartridge, for example, over a period ranging from several months up to a year or more, without suffering, to any service-relevant extent, any change in its performance properties or in its properties after curing. Typically the storage stability is determined via measurement of the viscosity, extrusion volume or extrusion force.

The composition preferably contains no free isocyanate groups. An isocyanate-free composition of this kind is advantageous from the toxicological standpoint.

It has been found that the reaction product R described can be used as an adhesion promoter for silane-functional polymers having end groups of the formula (I).

Additionally it has been found that the reaction product R described can be used as a catalyst for silane-functional polymers having end groups of the formula (I).

When the moisture-curing composition described is applied to at least one solid or article, the silane groups of the polymer and of the silanes come into contact with moisture. The silane groups have the property of hydrolyzing on contact with moisture. This is accompanied by formation of organosilanols (organosilicon compounds containing one or more silanol groups, Si—OH groups) and, as a result of subsequent condensation reactions, of organosiloxanes (organosilicon compounds containing one or more siloxane groups, Si—O—Si groups). As the outcome of these reactions, which may be accelerated through the use of catalysts, the composition finally cures; this process is also referred to as crosslinking. The water required for the curing reaction either may come from the air (atmospheric humidity), or else the composition may be contacted with a water-containing component, by being spread-coated, for example, with a smoothing agent, or by being sprayed, or else the composition during application can have a water-containing component added to it, in the form for example of a hydrous paste, which is mixed in via a static mixer, for example.

The composition described cures on contact with moisture. Curing takes place at different rates according to the temperature, the nature of the contact, the amount of moisture, and the presence of any catalysts. In the case of curing by means of atmospheric moisture, a skin is first formed on the surface of the composition. The skinover time, as it is known, thus represents a measure of the cure rate. A skinover time of this kind of up to 4 hours at 23° C. and 50% relative atmospheric humidity is typically desirable. In the cured state the composition possesses high mechanical strength in combination with high extensibility, and also good adhesion properties. This makes it suitable for a multiplicity of applications, more particularly as an elastic adhesive, as an elastic sealant or as an elastic coating. It is suitable more particularly for applications which require rapid curing and impose exacting requirements on extensibility, in tandem with exacting requirements on the adhesion properties and on the strengths.

Examples of suitable applications include the adhesive bonding of components in construction or civil engineering and in the manufacture or repair of industrial products or consumer goods, more particularly of windows, household appliances or means of transport, such as land or water vehicles, preferably automobiles, buses, trucks, trains or boats; the sealing of joints, seams or cavities in industrial manufacture or repair, or in construction or civil engineering; and the coating of various substrates, in the form for example of a paint, varnish, primer, sealant or protective coating, or as a floor covering, for offices, living areas, hospitals, schools, warehouses, and vehicle parking facilities.

In one preferred embodiment the composition described is used as an elastic adhesive or sealant.

As an elastic adhesive, the composition typically has a breaking elongation of at least 200% and, as an elastic sealant, it has a breaking elongation of at least 500% at room temperature.

In its application as an adhesive, the composition is applied to a substrate S1 and/or a substrate S2. The adhesive may therefore be applied to one substrate or the other or to both substrates. Thereafter the parts to be bonded are joined, whereupon the adhesive cures by contact with moisture. Here it should be ensured that the joining of the parts takes place within the time known as the open time, in order to ensure that both adherends are reliably bonded to one another.

In its application as a sealant, the composition is applied between the substrates S1 and S2 and is subsequently cured by contact with moisture. Typically the sealant is injected into a joint.

In both applications the substrate S1 may be the same as or different than substrate S2.

Suitable substrates S1 and S2 are, for example, inorganic substrates such as glass, glass ceramic, concrete, mortar, brick, tile, gypsum and natural stones such as granite or marble; metals or alloys such as aluminum, steel, nonferrous metals, galvanized metals; organic substrates such as wood, plastics such as PVC, polycarbonates, PMMA, polyesters, epoxy resins; coated substrates such as powder-coated metals or alloys; and also paints and varnishes, more particularly automotive topcoats.

If necessary the substrates can be pretreated prior to the application of the adhesive or sealant. Pretreatments of this kind include more particularly physical and/or chemical cleaning techniques, examples being abrading, sandblasting, brushing or the like, or treatment with cleaners or solvents, or the application of an adhesion promoter, adhesion promoter solution or primer.

After the substrates S1 and S2 have been adhesively bonded or sealed by means of a composition of the invention, an adhesively bonded or sealed article is obtained. An article of this kind may be a built structure, more particularly a built structure in construction or civil engineering, or it can be a means of transport, such as a water or land vehicle, more particularly an automobile, a bus, a truck, a train or a boat, or a component thereof for surface mounting.

For application of the composition as a sealant for joints, for example, in construction or civil engineering, or for application as an adhesive for elastic bonds, such as in vehicle construction, for example, the composition preferably has a pastelike consistency with properties of structural viscosity. A pastelike sealant or adhesive of this kind is applied to the substrate by means of a suitable apparatus. Suitable methods of application are, for example, application from commercially customary cartridges, which are operated manually or by means of compressed air, or from a drum or hobbock by means of a conveying pump or an extruder, where appropriate by means of an application robot.

An adhesive or sealant having good application properties features firmness of consistency and short stringing. That is, it remains in the applied form following application, in other words does not run apart, and, after the application device has been set down, the adhesive or sealant forms very short strings, if any at all, so that the substrate is not fouled.

An adhesive for elastic bonds, in vehicle construction, for example, is applied preferably in the form of a bead having a substantially circular or triangular cross-sectional area.

Elastic bonds in vehicle construction are, for example, the adhesive attachment of parts, such as plastic covers, trim strips, flanges, bumpers, driver's cabs or other components for mounting, to the painted bodywork of a means of transport, or the adhesive installation of glass into the bodywork. Examples of vehicles to be mentioned include automobiles, trucks, buses, rail vehicles, and boats.

The moisture-curing composition of the invention comprising at least one silane-functional polymer P having end groups of the formula (I) and at least one reaction product R cures rapidly and combines very high extensibility with high reactivity, good adhesion properties, and high tensile strength. In comparison with prior-art systems containing an unadducted aminosilane A1 instead of a reaction product R, the extensibility is significantly increased.

EXAMPLES

Description of Test Methods

The viscosity was measured on a Physica UM thermostatted cone/plate viscometer (cone diameter 20 mm, cone angle 1°, cone tip-plate distance 0.05 mm, shear rate 10 to 1000 $s^{-1}$).

The skinover time (time to absence of tack, tack-free time) as a measure of the cure rate was determined at 23° C. and 50% relative humidity.

The tensile strength and the breaking elongation were determined in accordance with DIN 53504 (pulling speed: 200 mm/min) on films 2 mm thick cured for 14 days under standard conditions (23±1° C., 50±5% relative humidity).

The adhesions were determined as follows:

The adhesion was tested using aluminum AlMgSi1 and PVC in the form of plaques available from the company Rocholl, Schönbrunn, Germany. The plaques were cleaned with Sika® Cleaner 205. Following a flash-off time of 10 minutes, the respective composition was applied from a cartridge in the form of a bead to each plaque. The bead-coated plaques were then stored under standard conditions (23±1° C., 50±5% relative humidity) for 7 days, after which the adhesion was tested. To test the adhesion, an incision was made into one end of the cured bead down to just above the surface of the plaque (bondline). The incised end of the bead was held by hand and then pulled carefully and slowly from the plaque surface with a peeling action in the direction of the other end of the bead. If, in the course of this removal, the adhesion was so strong that the end of the bead threatened to tear off when being pulled, a cutter was used to apply a cut perpendicular to the bead-pulling direction, down to the bare surface of the plaque, and in this way a section of bead was detached. Cuts of this kind were repeated, if necessary, in the course of continued pulling, at intervals of 2 to 3 mm. In this way the entire bead was pulled and/or cut from the plaque. The adhesion properties were evaluated on the basis of the cured sealant or adhesive which remained on the substrate surface after the bead had been removed (cohesive fracture), this being accomplished by estimating the cohesive fraction of the adhesion area, in accordance with the following scale:

1=more than 95% cohesive fracture
2=75%-95% cohesive fracture
3=25%-75% cohesive fracture
4=less than 25% cohesive fracture Test results with cohesive fracture values of less than 75%, i.e., scores of 3 and 4, are considered inadequate.

a) Preparation of Silane-Functional Polymers P

Polymer 1

Under a nitrogen atmosphere 1000 g of Acclaim® 12200 (Bayer; low monol polyoxypropylene diol, OH number 11.0 mg KOH/g, water content about 0.02% by weight), 36.1 g of isophorone diisocyanate Vestanat® IPDI, Degussa), 292.3 g of diisodecyl phthalate (DIDP; Palatinol® Z, BASF), and 0.23 g of di-n-butyltin dilaurate were heated to 90° C. with constant stirring and left at that temperature until the free isocyanate group content had reached a figure of 0.33% by weight. Subsequently 37.7 g of diethyl N-(3-trimethoxysilylpropyl)aminosuccinate were mixed in and the mixture was stirred at 90° C. for 4 hours until free isocyanate was no longer detected by IR spectroscopy. The product was cooled to room temperature and kept under moisture-free conditions (theoretical polymer content=78.6%).

Diethyl N-(3-trimethoxysilylpropyl)aminosuccinate was prepared as follows: 51.0 g of 3-aminopropyltrimethoxysilane (Silquest® A-1110, GE Advanced Materials) were introduced as an initial charge, with thorough stirring, 49.0 g of diethyl maleate were added slowly at room temperature and the mixture was stirred at room temperature for 8 hours.

Polymer 2

Under a nitrogen atmosphere 1000 g of Acclaim® 12200 polyol (Bayer; low monol polyoxypropylene diol, OH number 11.0 mg KOH/g, water content about 0.02% by weight), 43.6 g of isophorone diisocyanate (IPDI; Vestanat® IPDI, Degussa), 126.4 g of diisodecyl phthalate (DIDP; Palatinol® Z, BASF), and 0.12 g of di-n-butyltin dilaurate were heated to 90° C. with constant stirring and left at that temperature until the free isocyanate group content as determined by titrimetry had reached a figure of 0.63% by weight. Subsequently 62.3 g of diethyl N-(3-trimethoxysilylpropyl)aminosuccinate were mixed in and the mixture was stirred at 90° C. for 4 hours until free isocyanate was no longer detected by IR spectroscopy. The product was cooled to room temperature and kept under moisture-free conditions (theoretical polymer content=89.7%).

Diethyl N-(3-trimethoxysilylpropyl)aminosuccinate was prepared as described for Polymer 1.

b) Preparation of Reaction Products R

Reaction Product R1

75.0 g (0.34 mol) of N-(2-aminoethyl)-3-aminopropyltrimethoxysilane (Dynasylan® DAMO, Degussa) were admixed with thorough stirring with 71.5 g (0.34 mol) of isodecyl acrylate (Sartomer® SR-395, Sartomer) and the mixture was stirred at room temperature for 2 hours. This gave a pale yellow liquid having a viscosity at 20° C. of 40 mPa·s.

Reaction Product R2

22.0 g (0.12 mol) of 3-aminopropyltrimethoxysilane (Silquest® A-1110, GE Advanced Materials) were admixed with thorough stirring with 26.0 g (0.12 mol) of isodecyl acrylate (Sartomer® SR-395, Sartomer) and the mixture was stirred at room temperature for 2 hours. This gave a pale yellow viscous liquid.

Reaction Product R3

34.7 g (0.16 mol) of N-(2-aminoethyl)-3-aminopropyltrimethoxysilane (Dynasylan® DAMO, Degussa) were admixed with thorough stirring with 32.5 g (0.16 mol) of isobornyl acrylate (Sartomer® SR-506, Sartomer) and the mixture was stirred at room temperature for 2 hours. This gave a pale yellow viscous liquid.

Reaction Product R4

22.38 g (0.125 mol) of 3-aminopropyltrimethoxysilane (Silquest® A-1110, GE Advanced Materials) were admixed with thorough stirring with 26.0 g (0.125 mol) of isobornyl acrylate (Sartomer® SR-506, Sartomer) and the mixture was stirred at room temperature for 2 hours. This gave a pale yellow viscous liquid.

Reaction Product R5

19.5 g (0.09 mol) of N-(2-aminoethyl)-3-aminopropyltrimethoxysilane (Dynasylan® DAMO, Degussa) were admixed with thorough stirring with 19.5 g (0.09 mol) of isobornyl methacrylate (Sartomer® SR-423, Sartomer) and the mixture was left at 55° C. for 3 days. This gave a pale yellow viscous liquid.

Reaction Product R6

37.1 g (0.17 mol) of N-(2-aminoethyl)-3-aminopropyltrimethoxysilane (Dynasylan® DAMO, Degussa) were admixed with thorough stirring with 26.0 g (0.17 mol) of tetrahydrofurfuryl acrylate (Sartomer® SR-285, Sartomer) and the mixture was stirred at room temperature for 2 hours. This gave a reddish viscous liquid.

Reaction Product R7

34.0 g (0.15 mol) of N-(2-aminoethyl)-3-aminopropyltrimethoxysilane (Dynasylan® DAMO, Degussa) were admixed with thorough stirring with 26.0 g (0.15 mol) of tetrahydrofurfuryl methacrylate (Sartomer® SR-203, Sartomer) and the mixture was left at 55° C. for 3 days. This gave a reddish viscous liquid.

Reaction Product R8

24.1 g (0.11 mol) of N-(2-aminoethyl)-3-aminopropyltrimethoxysilane (Dynasylan® DAMO, Degussa) were admixed with thorough stirring with 26.0 g (0.11 mol) of lauryl acrylate (Sartomer® SR-335, Sartomer) and the mixture was stirred at room temperature for 2 hours. This gave a pale yellow viscous liquid.

Reaction Product R9

22.8 g (0.10 mol) of N-(2-aminoethyl)-3-aminopropyltrimethoxysilane (Dynasylan® DAMO, Degussa) were admixed with thorough stirring with 26.0 g (0.10 mol) of lauryl methacrylate (Sartomer® SR-313E, Sartomer) and the mixture was left at 55° C. for 3 days. This gave a pale yellow viscous liquid.

Reaction Product R10

23.3 g (0.105 mol) of N-(2-aminoethyl)-3-aminopropyltrimethoxysilane (Dynasylan® DAMO, Degussa) were admixed with thorough stirring with 26.0 g (0.105 mol) of ethylene glycol dicyclopentenyl ether acrylate (Aldrich, CAS No. 65983-31-5) and the mixture was stirred at room temperature for 2 hours. This gave a pale yellow liquid having a viscosity of 380 mPa·s.

Reaction Product R11

22.2 g (0.10 mol) of N-(2-aminoethyl)-3-aminopropyltrimethoxysilane (Dynasylan® DAMO, Degussa) were admixed with thorough stirring with 5.3 g (0.10 mol) of acrylonitrile and the mixture was stirred at room temperature for 2 hours. This gave a pale yellow liquid having a viscosity of 30 mPa·s.

Reaction Product R12

22.2 g (0.10 mol) of N-(2-aminoethyl)-3-aminopropyltrimethoxysilane (Dynasylan® DAMO, Degussa) were admixed with thorough stirring with 8.1 g (0.10 mol) of (cis)-2-pentenenitrile and the mixture was stirred at 45° C. for 10 hours. This gave a pale yellow liquid having a viscosity of 18 mPa·s.

Reaction Product R13

22.2 g (0.10 mol) of N-(2-aminoethyl)-3-aminopropyltrimethoxysilane (Dynasylan® DAMO, Degussa) were admixed with thorough stirring with 9.9 g (0.10 mol) of N,N-dimethacrylamide and the mixture was stirred at room temperature for 2 hours. This gave a pale yellow liquid having a viscosity of 50 mPa·s.

Reaction Product R14

7.99 g (36 mmol) of N-(2-aminoethyl)-3-aminopropyltrimethoxysilane (Dynasylan® DAMO, Degussa) in 10 ml of tetrahydrofuran were admixed with thorough stirring with 5.0 g (36 mmol) of N-propylmaleimide in solution in 10 ml of tetrahydrofuran and the mixture was stirred at room temperature for 5 hours. The reaction mixture was concentrated on a rotary evaporator. This gave 12.86 g of a yellowish viscous liquid.

Reaction Product R15 (Comparative)

22.2 g (0.10 mol) of N-(2-aminoethyl)-3-aminopropyltrimethoxysilane (Dynasylan® DAMO, Degussa) were admixed with thorough stirring with 17.2 g (0.10 mol) of diethyl maleate and the mixture was stirred at room temperature for 2 hours. This gave a pale yellow viscous liquid. The next day it was found, on the basis of the measured amine number and the FT-IR spectrum, that the reaction product was largely in the form of the cyclic 1,4-piperazin-2-one derivative, as described in U.S. Pat. No. 6,703,453 in the formula (IV).

Reaction Product R16 (Comparative)

24.4 g (0.11 mol) of N-(2-aminoethyl)-3-aminopropyltrimethoxysilane (Dynasylan® DAMO, Degussa) were admixed with thorough stirring with 32.5 g (0.11 mol) of trimethylolpropane triacrylate (Sartomer® SR-351, Sartomer). The viscous mixture gelled on heating within minutes. Consequently the material could not be used as an additive in a moisture-curing composition.

Reaction Product R17 (Comparative)

24.4 g (0.11 mol) of N-(2-aminoethyl)-3-aminopropyltrimethoxysilane (Dynasylan® DAMO, Degussa) were admixed with thorough stirring with 24.9 g (0.11 mol) of 1,6-hexanediol diacrylate (Sartomer® SR-328, Sartomer). The viscous mixture gelled on heating within minutes. Consequently the material could not be used as an additive in a moisture-curing composition.

c) Preparation of Urea Thickener Paste

A vacuum mixer was charged with 1000 g of diisodecyl phthalate and 160 g of 4,4'-diphenylmethane diisocyanate and this initial charge was gently warmed. Then 90 g of monobutylamine were added slowly dropwise with vigorous stirring. The white paste formed was stirred for an hour under reduced pressure and with cooling. The urea thickener paste contains 20% by weight of urea thickener in 80% by weight of diisodecyl phthalate.

d) Production of Sealants

Base Formulation 1

In a vacuum mixer 2700 g of polymer 1, 1295 g of diisodecyl phthalate (DIDP; Palatinol® Z, BASF), 100 g of vinyltrimethoxysilane (Silquest® A-171, GE Advanced Materials), 1200 g of urea thickener paste, 4500 g of precipitated coated calcium carbonate (Socal® U1S2, Solvay), 20 g of N-(2-aminoethyl)-3-aminopropyltrimethoxysilane (Dynasylan® DAMO, Degussa), and 5 g of dibutyltin dilaurate were processed to a homogeneous paste which was kept under moisture-free conditions.

Base Formulation 2

In a vacuum mixer 2700 g of MS-Polymer S203H (silane-functional polyether polymer from Kaneka), 1250 g of diisodecyl phthalate (DIDP; Palatinol® Z, BASF), 100 g of vinyltrimethoxysilane (Silquest® A-171, GE Advanced Materials), 1200 g of urea thickener paste, 4500 g of precipitated coated calcium carbonate (Socal® U1S2, Solvay), 20 g of N-(2-aminoethyl)-3-aminopropyltrimethoxysilane (Dynasylan® DAMO, Degussa), and 50 g of dibutyltin diacetylacetoriate were processed to a homogeneous paste which was kept under moisture-free conditions.

Examples 1 to 5

In a vacuum mixer the base formulation 1 was mixed as per table 1 with a reaction product R prepared the day before or with an aminosilane A1 in the amount indicated, homogeneously and at room temperature, and the resultant sealants were dispensed into cartridges under moisture-free conditions. The next day the sealants were used to produce test specimens, the tests were carried out as described, and the results were collated in table 1.

TABLE 1

Compositions and test results of the sealants of examples 1 to 3 and of comparative examples 4 and 5.

| | Example | | | | |
|---|---|---|---|---|---|
| | 1 | 2 | 3 | 4 (compar.) | 5 (compar.) |
| Composition: | | | | | |
| Base formulation 1 | 100 | 100 | 100 | 100 | 100 |
| Aminosilane A1 | — | — | — | — | DAMO[1] |
| Amount | | | | | 1.0 |
| Reaction product R | R1 | R1 | R1 | — | — |
| Amount | 0.5 | 1.8 | 3.0 | | |
| Test results: | | | | | |
| Skinover time [min] | 105 | 70 | 60 | 420 | 60 |
| Tensile strength [MPa] | 2.8 | 2.5 | 2.1 | 2.6 | 2.0 |
| Breaking elongation [%] | 940 | 980 | 920 | 830 | 530 |
| Adhesion: | | | | | |
| Aluminum AlMgSi1 | 1 | 1 | 1 | 3 | 1 |
| PVC | 1 | 1 | 1 | 3 | 1 |

Amounts are in parts by weight.
[1]DAMO = Dynasylan® DAMO (Degussa).

From table 1 it is apparent that the inventive sealants of examples 1 to 3, containing different amounts of the reaction product R1, rapidly form a skin, have good mechanical properties, more particularly a high extensibility, and have good adhesion properties.

The sealant of comparative example 4, which contains no reaction product R1, likewise has good mechanical properties, but the skinover time is much longer and the adhesion properties are poorer.

The sealant of comparative example 5, which contains additional aminosilane A1 instead of the reaction product R1, shows a short skinover time and good adhesion properties, but the breaking elongation is unsatisfactorily low.

Examples 6 to 18

In a vacuum mixer the base formulation 1 was mixed in each case as per table 2 with a reaction product R prepared the day before in the amount indicated, homogeneously and at room temperature, and the resultant sealants were dispensed into cartridges under moisture-free conditions. The next day the sealants were used to produce test specimens, the tests were carried out as described, and the results were collated in table 2.

TABLE 2

Compositions and test results of the sealants of examples 6 to 18.

| | Example | | | | | | |
|---|---|---|---|---|---|---|---|
| | 6 | 7 | 8 | 9 | 10 | 11 | 12 |
| Composition: | | | | | | | |
| Base formulation 1 | 100 | 100 | 100 | 100 | 100 | 100 | 100 |
| Reaction product R | R2 | R3 | R4 | R5 | R6 | R7 | R8 |
| Amount | 1.8 | 1.8 | 1.8 | 1.8 | 1.8 | 1.8 | 1.8 |
| Test results: | | | | | | | |
| Skinover time [min] | 105 | 70 | 120 | 70 | 60 | 60 | 70 |
| Tensile strength [MPa] | 2.5 | 2.6 | 2.6 | 2.4 | 2.1 | 2.3 | 2.5 |
| Breaking elongation [%] | 1030 | 1030 | 1060 | 920 | 660 | 710 | 920 |
| Adhesion: | | | | | | | |
| Aluminum AlMgSi1 | 1 | 1 | 1 | 1 | 1 | 1 | 1 |
| PVC | 3 | 3 | 3 | 1 | 1 | 1 | 1 |

TABLE 2-continued

Compositions and test results of the sealants of examples 6 to 18.

|  | Example | | | | | |
|---|---|---|---|---|---|---|
|  | 13 | 14 | 15 | 16 | 17 | 18 |
| Composition: | | | | | | |
| Base formulation 1 | 100 | 100 | 100 | 100 | 100 | 100 |
| Reaction product R | R9 | R10 | R11 | R12 | R13 | R14 |
| Amount | 1.8 | 1.8 | 1.8 | 1.8 | 1.8 | 1.8 |
| Test results: | | | | | | |
| Skinover time [min] | 90 | 70 | 60 | 60 | 60 | 100 |
| Tensile strength [MPa] | 2.3 | 2.4 | 2.2 | 2.0 | 2.2 | 2.5 |
| Breaking elongation [%] | 880 | 900 | 750 | 680 | 840 | 710 |
| Adhesion: | | | | | | |
| Aluminum AlMgSi1 | 1 | 1 | 1 | 4 | 1 | 3 |
| PVC | 1 | 1 | 1 | 1 | 1 | 1 |

Amounts are in parts by weight.

From table 2 it is apparent that all of the sealants of examples 6 to 18 exhibit a short skinover time and have good mechanical properties, more particularly a high extensibility. The adhesion properties are good in the majority of cases.

Examples 19 to 21

In a vacuum mixer the base formulation 2 was mixed as per table 3 with a reaction product R prepared the day before or with an aminosilane A1 in the amount indicated, homogeneously and at room temperature, and the resultant sealants were dispensed into cartridges under moisture-free conditions. The next day the sealants were used to produce test specimens, the tests were carried out as described, and the results were collated in table 3.

TABLE 3

Compositions and test results of the sealants of examples 19 and 20 and of comparative example 21.

|  | Example | | |
|---|---|---|---|
|  | 19 | 20 | 21 (compar.) |
| Composition: | | | |
| Base formulation 2 | 100 | 100 | 100 |
| Aminosilane A1 | — | — | DAMO[1] |
| Amount | | | 1.0 |
| Reaction product R | R1 | R3 | — |
| Amount | 1.8 | 1.8 | |
| Test results: | | | |
| Skinover time [min] | 105 | 105 | 60 |
| Tensile strength [MPa] | 1.1 | 1.0 | 1.3 |
| Elongation at break [%] | 760 | 880 | 650 |
| Adhesion: | | | |
| Aluminum AlMgSi1 | 2 | 1 | 2 |
| PVC | 3 | 3 | 2 |

Amounts are in parts by weight.
[1]DAMO = Dynasylan ® DAMO (Degussa).

From table 3 it is apparent that the inventive sealants of examples 19 and 20 exhibit increased extensibility as compared with the sealant of comparative example 21, which contains additional aminosilane A1 instead of a reaction product R. The adhesion properties of the three examples are comparable.

e) Production of Adhesives

Base Formulation 3

In a vacuum mixer 3500 g of Polymer 2, 1290 g of diisodecyl phthalate (DIDP; Palatinol® Z, BASF), 100 g of vinyltrimethoxysilane (Silquest® A-171, GE Advanced Materials), 4650 g of precipitated coated calcium carbonate (Socal® U1S2, Solvay), 250 g of fumed silica, 20 g of N-(2-aminoethyl)-3-aminopropyltrimethoxysilane (Dynasylan® DAMO, Degussa), and 10 g of dibutyltin dilaurate were processed to a homogeneous paste which was kept under moisture-free conditions.

Examples 22 to 27

In a vacuum mixer the base formulation 3 was mixed in each case as per table 4 with a reaction product R prepared the day before or with an aminosilane A1 in the amount indicated, homogeneously and at room temperature, and the resultant adhesives were dispensed into cartridges under moisture-free conditions. The next day the adhesives were used to produce test specimens, the tests were carried out as described, and the results were collated in table 4.

TABLE 4

Composition and test results of the adhesives of examples 22 to 24 and of comparative examples 25 to 27.

|  | Example | | | | | |
|---|---|---|---|---|---|---|
|  | 22 | 23 | 24 | 25 | 26 | 27 |
| Composition: | | | | | | |
| Base formulation 3 | 100 | 100 | 100 | 100 | 100 | 100 |
| Aminosilane A1 | — | — | — | — | — | DAMO[1] |
| Amount | | | | | | 1.0 |
| Reaction product R | R1 | R3 | R5 | R15 | — | — |
| Amount | 1.8 | 1.8 | 1.8 | 1.8 | | |
| Test results: | | | | | | |
| Skinover time [min] | 80 | 90 | 90 | 600 | 1200 | 60 |
| Tensile strength [MPa] | 3.0 | 2.9 | 3.1 | 3.1 | 1.8 | 2.8 |
| Breaking elongation [%] | 500 | 500 | 490 | 510 | 550 | 330 |

TABLE 4-continued

Composition and test results of the adhesives of examples 22 to 24 and of comparative examples 25 to 27.

| | Example | | | | | |
|---|---|---|---|---|---|---|
| | 22 | 23 | 24 | 25 | 26 | 27 |
| Adhesion: | | | | | | |
| Aluminum AlMgSi1 | 1 | 1 | 1 | 3 | 4 | 1 |
| PVC | 1 | 2 | 2 | 1 | 4 | 1 |

Amounts are in parts by weight.
[1]DAMO = Dynasylan ® DAMO (Degussa).

From table 4 it is apparent that the inventive adhesives of examples 22 to 24 exhibit a short skinover time, have good mechanical properties, more particularly a high extensibility, and have good adhesion properties.

The adhesive of comparative example 25 comprises the reaction product R15 as disclosed in U.S. Pat. No. 6,703,453, and is not an inventive example. The skinover time of this adhesive is greatly increased as compared with the inventive adhesives of examples 22 to 24, which is a great disadvantage for practical use as an adhesive.

The adhesive of comparative example 26 contains neither a reaction product R nor additional silane. It has a long skinover time and also has unsatisfactory adhesion properties.

The adhesive of comparative example 27 contains additional aminosilane A1 instead of a reaction product R. The skinover time and the adhesion properties are good, but the breaking elongation is much lower than in the case of the other adhesives, which is a disadvantage for use as an elastic adhesive.

The invention claimed is:

1. A moisture-curing composition comprising
   a) at least one silane-functional polyurethane polymer P having end groups of the formula (I)

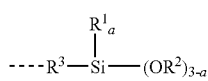
(I)

where
$R^1$ is an alkyl group having 1 to 8 C atoms;
$R^2$ is an acyl group or alkyl group having 1 to 5 C atoms;
$R^3$ is a linear or branched, optionally cyclic, alkylene group having 2 to 12 C atoms, optionally with aromatic fractions, and optionally with one or more heteroatoms;
a is 0, 1 or 2; and
   b) at least one reaction product R, prepared from at least one aminosilane A1 of the formula (IX)

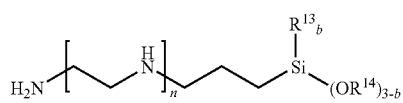
(IX)

with n =1 or 2 and b =0 or 1, $R^{13}$ being an alkyl group having 1 to 8 C atoms, and $R^{14}$ =methyl or ethyl or isopropyl,
and
at least one silane-group-free alkene M of the formula (II) or (III) or (IV)

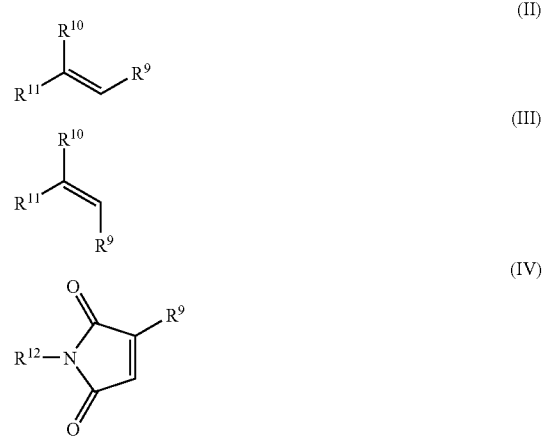

where
$R^9$ is $R^{12}$ or —CN, and
$R^{10}$ is a substituent selected from the group consisting of —COOR$^{12}$, —CONHR$^{12}$, —CON(R$^{12}$)$_2$, —CN, —NO$_2$, —PO(OR$^{12}$)$_2$, —SO$_2$,R$^{12}$, and —SO$_2$OR$^{12}$,
$R^{11}$ is a substituent selected from the group consisting of —R$^{12}$, —COOR$^{12}$, —CH$_2$—COOR$^{12}$, and —CN, and
$R^{12}$ is a hydrogen atom or a monovalent, optionally heteroatom-containing, hydrocarbon radical having 1 to 20 C atoms.

2. The moisture-curing composition of claim 1, wherein the silane-functional polyurethane polymer P is a polymer P1 which is prepared by the reaction of an aminosilane A2 with a polyurethane polymer containing terminal isocyanate groups, the aminosilane A2 having the formula (V)

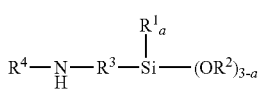
(V)

where $R^4$ is a hydrogen atom or is a linear or branched hydrocarbon radical having 1 to 20 C atoms which optionally contains cyclic fractions, or is a radical of the formula (VI)

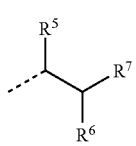
(VI)

where
$R^5$ and $R^6$, independently of one another, are each a hydrogen atom or a radical selected from the group consisting of —R$^8$, —COOR$^8$, and —CN, and
$R^7$ is a hydrogen atom or is a radical selected from the group consisting of —CH$_2$—COOR$^8$, —COOR$^8$, —CONHR$^8$, —CON(R$^8$)$_2$, —CN, —NO$_2$, —PO (OR$^8$)$_2$, —SO$_2$R$^8$, and —SO$_2$OR$^8$, where R$^8$ is a hydrocarbon radical having 1 to 20 C atoms and optionally containing at least one heteroatom.

3. The moisture-curing composition of claim 1, wherein the silane-functional polyurethane polymer P is a polymer P2 obtained by the reaction of an isocyanatosilane IS with a polymer containing terminal hydroxyl groups.

4. The moisture-curing composition of claim 3, wherein the isocyanatosilane IS has the formula (VII)

(VII)

5. The moisture-curing composition of claim 1, wherein the moisture-curing composition has a reaction product R content of 0.1% - 10% by weight.

6. A method of producing the moisture-curing composition of claim 1 comprising combining the silane-functional polyurethane polymer P with the reaction product R to obtain the moisture-curing composition.

7. A method of sealing comprising
(i) applying the moisture-curing composition of claim 1 between a substrate S1 and a substrate S2, and
(ii) curing the composition by contact with moisture, the substrates S1 and S2 being alike or different from one another.

8. A method of adhesive bonding comprising
(i) applying the moisture-curing composition of claim 1 to a substrate S1 and/or a substrate S2,
(ii) joining the parts within the open time, and
(iii) curing the composition by contact with moisture, the substrates S1 and S2 being alike or different from one another.

9. The method of claim 7, wherein at least one of the substrates, S1 or S2, is glass, glass ceramic, concrete, mortar, brick, tile, plaster, a natural stone, a metal, an alloy, a wood, a plastic, a powder coating, a coat of paint, or a finish.

10. A sealed article produced by the method of claim 7.

11. The sealed article of claim 10, wherein the article is a built structure or a part thereof, or a vehicle or a part thereof.

12. An adhesively bonded article produced by the method of claim 8.

13. The adhesively bonded article of claim 12, wherein the article is a built structure or a part thereof, or a vehicle or a part thereof.

14. The moisture-curing composition of claim 1, wherein the silane-group-free alkene M is selected from the group consisting of tetrahydrofurfuryl, isobornyl, isodecyl, hexyl, lauryl, stearyl, ethylene glycol dicyclopentenyl ether, 2-hydroxyethyl, and 3-hydroxypropyl (meth)acrylate, (meth)acrylamide, N-methyl(meth)acrylamide, N,N-dimethyl (meth)acrylamide, dimethyl, diethyl, and dibutyl phosphonate, acrylonitrile, 2-pentenenitrile, fumaronitrile, β-nitrostyrene, and mixtures thereof.

* * * * *

UNITED STATES PATENT AND TRADEMARK OFFICE
CERTIFICATE OF CORRECTION

| | | |
|---|---|---|
| PATENT NO. | : 8,399,102 B2 | Page 1 of 1 |
| APPLICATION NO. | : 12/087730 | |
| DATED | : March 19, 2013 | |
| INVENTOR(S) | : Oertli et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this
Thirtieth Day of December, 2014

Michelle K. Lee
*Deputy Director of the United States Patent and Trademark Office*